United States Patent [19]

Ruggeri

[11] Patent Number: 4,510,188

[45] Date of Patent: Apr. 9, 1985

[54] TEXTILE MATERIAL OF A DARK FABRIC, LEATHER OR HIDE WITH LAYER OF MICROENCAPSULATED LIQUID CRYSTALS

[76] Inventor: Cinzia Ruggeri, Via Fratelli Gabba 7, 20100 Milano, Italy

[21] Appl. No.: 472,093

[22] Filed: Mar. 4, 1983

[30] Foreign Application Priority Data

Mar. 11, 1982 [IT] Italy ............................... 20097 A/82

[51] Int. Cl.$^3$ ............................................... C09K 3/34
[52] U.S. Cl. ........................................ 428/1; 427/288; 428/240; 428/473; 428/913
[58] Field of Search ................... 428/1, 240, 473, 913; 427/256, 282, 288

[56] References Cited

U.S. PATENT DOCUMENTS 3,847,139  11/1974  Flam .................................... 428/1

Primary Examiner—Marion E. McCamish
Attorney, Agent, or Firm—McAulay, Fields, Fisher, Goldstein & Nissen

[57] ABSTRACT

A textile material for articles of clothing and the like comprises a support of fabric or leather, having applied to one of the surfaces thereof a composition of cholesteric liquid crystals, the color of which varies on varying the temperature or the visual angle under which the surface is observed.

20 Claims, No Drawings

TEXTILE MATERIAL OF A DARK FABRIC, LEATHER OR HIDE WITH LAYER OF MICROENCAPSULATED LIQUID CRYSTALS

FIELD OF THE INVENTION

The present invention relates to a textile material, particularly useful for articles of clothing.

It is known that, especially in the field of the fashion, the manufacturers of fabrics have been and are constantly looking for textile materials, in which the properties of utility, strength, duration, etc., useful from the point of view of the manufacturing of clothes, curtains, coatings, are combined with novel and interesting decorative effects, especially of the chromatic type.

It is also known that to date in order to obtain contrasting chromatic effects in a fabric, the latter had to be produced on purpose or dyed anyhow otherwise recourse had to be made to applied or transferred decals. The results as obtained to date were always of static type since the chromatic effect remained permantly fixed, without any possibility of changing.

OBJECTS AND SUMMARY OF THE INVENTION

The main object of the present invention is that of providing a fabric in which the chromatic effect is variable with the environmental conditions.

A more specific object of the present invention is to provide a fabric whose color, either totally or in some predetermined parts thereof, varies with varying the temperatures or upon varying the visual angle under which the fabric is observed.

These objects and achieved by means of a dark and preferably black fabric to which is applied a composition of liquid crystals of cholesteric nature which are capable of changing their colour when a determined temperature value or a determined temperature range is arrived at or exceeded.

According to another embodiment of the fabric according to the invention there is applied to the said surface a composition of liquid crystals of cholesteric type, the colour of which varies on varying the visual angle under which the same surface is observed.

DISCLOSURES

It is known that by liquid crystals there are indicated chemical mesomorphic substances of cholesteric type having the property of changing their behaviour in respect of incident white light on varying the temperature and particularly of changing from a condition of total transparency to one in which they are coloured when the temperature at which they are reaches a value within a particular interval specific for each mesomorphic substance or combination of mesomorphic substances.

To date, most known uses of this principle were aimed at the temperature measurement, giving thus place to practical applications such thermometers for room temperature, and for body temperature, thermographic diagnostical devices based on the different temperatures of skin areas, etc.

More detailed information on the nature and on the types of cholesteric substances useful for these purposes as well as on their properties and behaviour is given in the prior technical literature, such as for instance the U.S. Pat. No. 3,576,761.

It has been now found and constitutes as already stated the subject of the present invention that the afore said properties which to date were exclusively limited, in a direct or indirect manner, to temperature measurement, can be usefully and advantageously exploited for the manufacturing of fabrics having novel and surprising decorative effects.

For the manufacturing of the fabrics according to the present invention, the liquid crystal composition, in a suitably microencapsulated form, is laid down onto one surface of the fabric which must necessarily be dark and preferably black in order to obtain the necessary background or contrast.

The composition is applied by coating, spraying or preferably by silkscreen printing, according to a predetermined pattern or drawing, whereafter an outer layer for the protection of the layer of microincapsulated liquid crystals is applied, for instance, in the form of a film of transparent plastic material.

The composition of the invention can be applied as a dispersion of microincapsulated liquid crystals in a dispersing and binding agent, the latter being a dispersion of a synthetic resin emulsifiable with water, such as a vinyl, acrylic methacrylic and amide resin. In this case the washability of the fabric is improved.

Some examples of liquid crystal compositions useful for the fabrics of the present invention are now given, by way of non-limiting examples and without any limiting intention.

EXAMPLE 1

A composition changing colour at 20° C. over a broad range (about 16° to 22° C.) comprises:

| Compound | parts by weight |
|---|---|
| cholesteryl nonanoate | 73.2 |
| oleyl cholesteryl carbonate | 11.7 |
| cholesteryl chloride | 15.6 |

EXAMPLE 2

A composition changing colour at 25° C. over the range of about 22° to 28° C. comprises:

| Compound | parts by weight |
|---|---|
| cholesteryl nonanoate | 76.6 |
| oleyl cholesteryl carbonate | 9.4 |
| cholesteryl chloride | 15.0 |

EXAMPLE 3

A composition changing colour at 28° C. over the broad range of about 26° to 31° comprises:

| Compound | parts by weight |
|---|---|
| cholesteryl nonanoate | 80.0 |
| oleyl cholesteryl carbonate | 5.0 |
| cholesteryl chloride | 15.5 |

"Broad range" in the preceeding examples means that the change of color takes place within the stated temperature interval.

It is to be noted that when the room temperature attains a value within one of the afore said intervals the composition will take a colour with varying shade according to the temperature.

As already stated, according to another embodiment of the present invention there is provided a fabric having changeable chromatic effect with liquid crystal compositions showing a different colour depending on the visual angle under which it is observed.

Differently from the preceeding embodiment, therefor, the fabric appears always coloured.

The manufacturing technique being unchanged, it will be sufficient to give hereinafter an example of aternary liquid crystal compositions to be used in order to obtain the desired results.

EXAMPLE 4

| Compound | parts by weight |
|---|---|
| cholesteryl nonanoate | 50 |
| oleyl cholesteryl carbonate | 50 |
| cholesteryl chloride | 30–50 |

In these compositions it is noted that as the proportion of cholesteryl chloride is increased, the prevailing colour changes from green-blue to orange and lastly yellow-orange.

In this case, furthermore, the liquid crystal composition is almost not influenced by any variation of the room temperature between 0° C. and 60° C., apart from slight shade variations which are noticed when a temperature variation of 20°–30° C. occurs. It is important to point out that in this case the content of cholesteryl chloride is important, the amount of which in fact does not find counterpart in the known compositions of the prior art and is remarkably higher.

It is furthermore to be noted that different types of liquid crystals can be substituted for the other two components of the composition, for instance cholesteryl pelargonate instead of cholesteryl nonanoate.

Lastly, it is worth to mention that as the support for the above liquid crystal compositions there can be identically used leather or hide of dark or black color with similiar results.

I claim:

1. A textile material useful for articles of clothing, curtains, or coatings in which the chromatic effect is variable with environmental conditions to produce decorative effects, comprising a support consisting of a dark fabric, leather or hide having on at least one surface thereof a layer of a microencapsulated liquid cholesteric crystal composition including:
   cholesteryl nonanoate: 73–80 parts by weight
   oleyl cholesteryl carbonate: 5–12 parts by weight
   cholesteryl chloride: 15 to 15.6 parts by weight; and
   said crystal composition being adapted to change from a transparent state to a colored state within a given temperature range in response to environmental conditions.

2. The material of claim 1, wherein said composition is by weight:
   cholesteryl nonanoate: 73.2
   oleyl cholesteryl carbonate: 11.7
   cholesteryl chloride: 15.6.

3. The material of claim 1, wherein said composition is by weight:
   cholesteryl nonanoate: 76.6
   oleyl cholesteryl carbonate: 9.4
   cholesteryl chloride: 15.0.

4. The material of claim 1, wherein said composition is by weight:
   cholesteryl nonanoate: 80.0
   oleyl cholesteryl carbonate: 5.0
   cholesteryl chloride: 15.5.

5. The material of claim 1, wherein said layer is applied to said surface by spray coating or silk screen printing.

6. The material of claim 1, having a protective outer film of transparent plastic over said layer.

7. The material of claim 1, wherein said layer is applied as a dispersion of liquid crystals in a synthetic resin emulsifiable with water.

8. The material of claim 7, wherein said resin is a vinyl, acrylic, methacrylic or amide resin.

9. A textile material useful for articles of clothing in which the chromatic effect is variable with environmental conditions, comprising a support consisting of a dark fabric, leather or hide having on at least one surface thereof a layer of a microencapsulated liquid cholesteric crystal composition comprising cholesteryl nonanoate, oleyl cholesteryl carbonate and cholesteryl chloride, said composition being ternary and containing 30 to 50 parts by weight of cholesteryl chloride per 100 parts of the other two components, and said composition being adapted to change from a transparent state to a colored state within a given temperature range in response to environmental conditions.

10. The material of claim 9, wherein said cholesteryl nonanoate and oleyl cholesteryl carbonate are present in equal amounts by weight.

11. The material of claim 9, wherein said layer is applied to said surface by spray coating on silk screen printing.

12. The material of claim 9, having a protective outer film of transparent plastic over said layer.

13. The material of claim 9, wherein said layer is applied as a dispersion of liquid crystals in a synthetic resin emulsifiable with water.

14. The material of claim 13, wherein said resin is a vinyl, acrylic, methacrylic or amide resin.

15. A process for making a textile material useful for curtains, coatings or articles of clothing in which the chromatic effect is variable with environmental conditions to produce decorative effects responsive to temperature variable chromatic effects which comprises:
   providing a support consisting of a dark fabric, hide or leather; and
   applying on at least one surface of said support a layer of a microencapsulated liquid cholesteric crystal composition containing at least 15 parts by weight of cholesteryl chloride as a dispersion of liquid crystals in a synthetic resin emulsifiable with water such that the liquid cholesteric crystal composition is adapted to change from a transparent state to a colored state within a given temperature range in response to environmental conditions.

16. The process of claim 15, wherein said resin is a vinyl, acrylic, methacrylic or amide resin.

17. The process of claim 15, wherein said composition comprises:
   cholesteryl nonanoate: 73–80 parts by weight
   oleyl cholesteryl carbonate: 5–12 parts by weight
   cholesteryl chloride: 15 to 15.6 parts by weight.

18. The process of claim 15, further including the steps of applying a protective outer film of transparent plastic over said layer.

19. The process of claim 18, wherein said composition comprises:
   cholesteryl nonanoate: 73–80 parts by weight
   oleyl cholesteryl carbonate: 5–12 parts by weight
   cholesteryl chloride: 15 to 15.6 parts by weight.

20. The process of claim 19, wherein said resin is a vinyl, acrylic, methoacrylic or amide resin.

* * * * *